(12) United States Patent
Desai et al.

(10) Patent No.: US 10,938,787 B2
(45) Date of Patent: Mar. 2, 2021

(54) CLOUD SERVICES MANAGEMENT SYSTEM AND METHOD

(71) Applicant: Kohl's, Inc., Menomonee Falls, WI (US)

(72) Inventors: Twinkle Desai, Foster City, CA (US); Thilaga Kumaran Srinivasan, Menomonee Falls, WI (US)

(73) Assignee: Kohl's, Inc., Menomonee Falls, WI (US)

( * ) Notice: Subject to any disclaimer, the term of this patent is extended or adjusted under 35 U.S.C. 154(b) by 132 days.

(21) Appl. No.: 16/204,818

(22) Filed: Nov. 29, 2018

(65) Prior Publication Data

US 2019/0173840 A1 Jun. 6, 2019

Related U.S. Application Data

(60) Provisional application No. 62/593,702, filed on Dec. 1, 2017.

(51) Int. Cl.
| | |
|---|---|
| *H04L 29/06* | (2006.01) |
| *H04L 29/08* | (2006.01) |
| *H04L 12/66* | (2006.01) |
| *H04L 12/851* | (2013.01) |
| *H04L 12/24* | (2006.01) |

(52) U.S. Cl.
CPC ............ *H04L 63/029* (2013.01); *H04L 12/66* (2013.01); *H04L 41/0803* (2013.01); *H04L 47/24* (2013.01); *H04L 63/0281* (2013.01); *H04L 67/10* (2013.01); *H04L 67/28* (2013.01); *H04L 41/0806* (2013.01)

(58) Field of Classification Search
CPC ............ H04L 63/0227; H04L 63/0236; H04L 63/0263; H04L 63/029; H04L 12/66; H04L 41/0803; H04L 47/24; H04L 63/0281; H04L 67/10; H04L 67/28; H04L 41/0806
See application file for complete search history.

(56) References Cited

U.S. PATENT DOCUMENTS 7,013,482 B1 * 3/2006 Krumel ............... H04L 63/0227
709/229
7,047,561 B1 * 5/2006 Lee ................... H04L 29/12009
726/12

(Continued)

*Primary Examiner* — Malcolm Cribbs
(74) *Attorney, Agent, or Firm* — Perkins Coie LLP

(57) ABSTRACT

A cloud services management system and method that is capable of ensuring that communication between one or more cluster master(s) and cluster nodes is disclosed. The cloud services management system ensures secure communication that are not susceptible to security breaches even when the cluster master(s) and the cluster nodes reside in different networks (and/or have different security profiles, particularly in a public network). The cloud service management system utilizes three main communication paths: (1) a first route to manage communication between cluster master and a cluster; (2) a second route to manage communication between a cluster and one or more services/APIs; and (3) a third route to manage communication between a cluster and external domains. One purpose of these routes is to prevent direct communication between a cluster and the Internet (since such communication can be unsecured and prone to security risks and threats).

18 Claims, 6 Drawing Sheets

(56) References Cited

U.S. PATENT DOCUMENTS

| | | | |
|---|---|---|---|
| 2004/0015719 A1* | 1/2004 | Lee | H04L 63/0227 726/23 |
| 2005/0163079 A1* | 7/2005 | Taniuchi | H04W 84/12 370/331 |
| 2006/0253903 A1* | 11/2006 | Krumel | H04L 63/0227 726/13 |
| 2007/0294754 A1* | 12/2007 | Finkelstein | H04L 63/0227 726/11 |
| 2010/0162036 A1* | 6/2010 | Linden | G06F 11/181 714/4.11 |
| 2014/0082749 A1* | 3/2014 | Holland | G06F 21/645 726/29 |
| 2014/0089500 A1* | 3/2014 | Sankar | H04L 47/125 709/224 |
| 2014/0355427 A1* | 12/2014 | Cheng | H04L 43/0888 370/230 |
| 2015/0146724 A1* | 5/2015 | Leung | H04L 45/745 370/392 |
| 2015/0326530 A1* | 11/2015 | Wood | G06F 21/554 726/11 |
| 2016/0006693 A1* | 1/2016 | Salcedo | H04L 63/0236 726/1 |
| 2016/0043901 A1* | 2/2016 | Sankar | H04L 41/12 709/226 |
| 2016/0099931 A1* | 4/2016 | Nethi | H04L 63/0815 726/8 |
| 2016/0234168 A1* | 8/2016 | Leung | H04L 63/0218 |
| 2016/0344758 A1* | 11/2016 | Cohen | G08B 21/18 |
| 2017/0026307 A1* | 1/2017 | Cheng | H04L 67/16 |
| 2017/0134428 A1* | 5/2017 | Vazquez Carames | H04L 61/2007 |
| 2018/0337887 A1* | 11/2018 | Aluvala | H04L 63/0281 |
| 2019/0109864 A1* | 4/2019 | Eren | H04W 12/12 |

\* cited by examiner

CLOUD SERVICES MANAGEMENT SYSTEM AND METHOD

CROSS-REFERENCE TO RELATED APPLICATIONS

This application claims the benefit of U.S. Provisional Patent Application No. 62/593,702 filed Dec. 1, 2017, entitled CLOUD SERVICES MANAGEMENT SYSTEM AND METHOD, which is herein incorporated by reference in its entirety.

BACKGROUND

Several solutions exist for managing environments for deploying containerized applications such as Google® Cloud, Microsoft® Azure, Amazon® Web Services, etc. Typically, a cloud computing platform comprises a set of individual self-contained environment(s) that run system processes and services for running software. These self-contained processing units are called containers. In order to scale these environments for higher system resources, containers typically operate as a cluster whereby the software processing is distributed across various nodes within a cluster. A container cluster may consist of at least one cluster master and multiple worker machines called nodes. These master and node machines run the cluster orchestration system. Containerized applications can then run on top of a cluster.

The cluster master is generally the unified endpoint for a container cluster. Internal cluster processes (such as the cluster nodes, system and components, application controllers) may interact with the cluster master via application programming interface (API) calls. The master typically runs an API server to handle these APIs. The API calls are made directly via hyper-text transfer protocol (HTTP), indirectly by running commands via a command-line interface, or by interacting with a user-interface in the cloud platform. The cluster master is responsible for deciding what runs on each of the cluster's nodes. This can include scheduling workloads, like containerized applications, and managing the workloads' lifecycle, scaling, and upgrades. The cluster master also manages network and storage resources for those workloads.

A container cluster typically has one or more nodes, which are the worker machines that run containerized applications and other workloads. Each cluster node is managed from the cluster master, which receives updates on each node's status. In some cloud services solutions, the cluster master resides in a network that is different from that of the cluster nodes. For example, the cluster master resides in a public network while the cluster nodes reside within a project assigned to a cloud services consumer (e.g., a corporation). In such instances, problems arise if the cloud services provider that hosts the cluster master uses a security paradigm that is different from that of the cloud services consumer. For example, a cloud services provider can implement security using domain-based whitelists, while the cloud services consumer (e.g., a corporation) can implement security using IP-based whitelists. As a result of these incompatibilities between the security paradigms, it is not possible for the cloud services consumer to run applications using the cloud services platform of the cloud services provider without compromising its security policies. If the cloud services consumer were to implement applications using the cloud services platform of an incompatible cloud services provider, it exposes the applications to severe security risks and threats. These risks and threats are of great concern in applications that have to comply with security standards (e.g., Payment Card Industry Data Security Standard (PCI DSS)) and/or involve sensitive information, such as personally identifiable information (PII).

DETAILED DESCRIPTION

Figure 1:
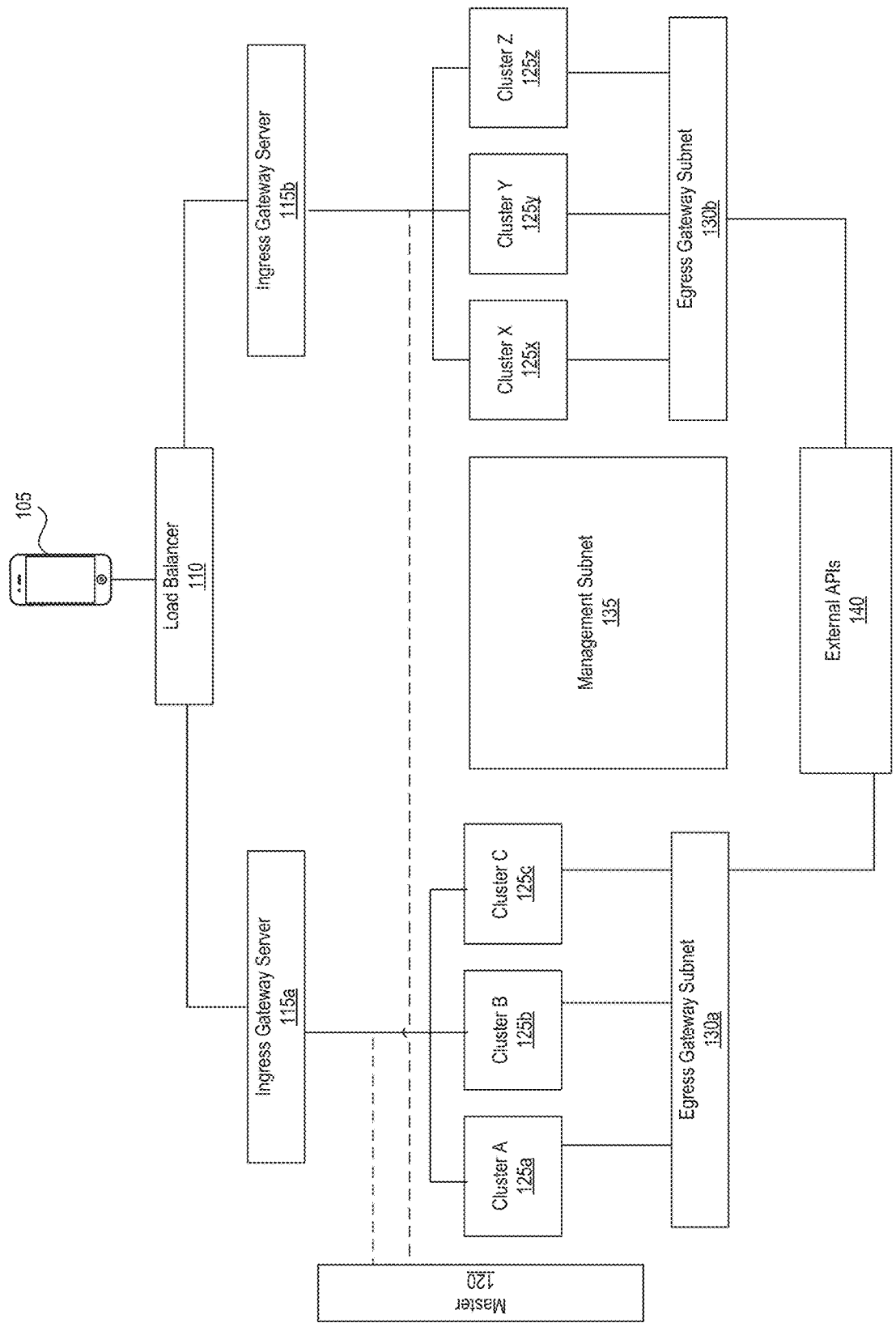
FIG. 1 is a system diagram illustrating an example of a computing environment in which a cloud services management framework can be utilized.
Figure 2A:
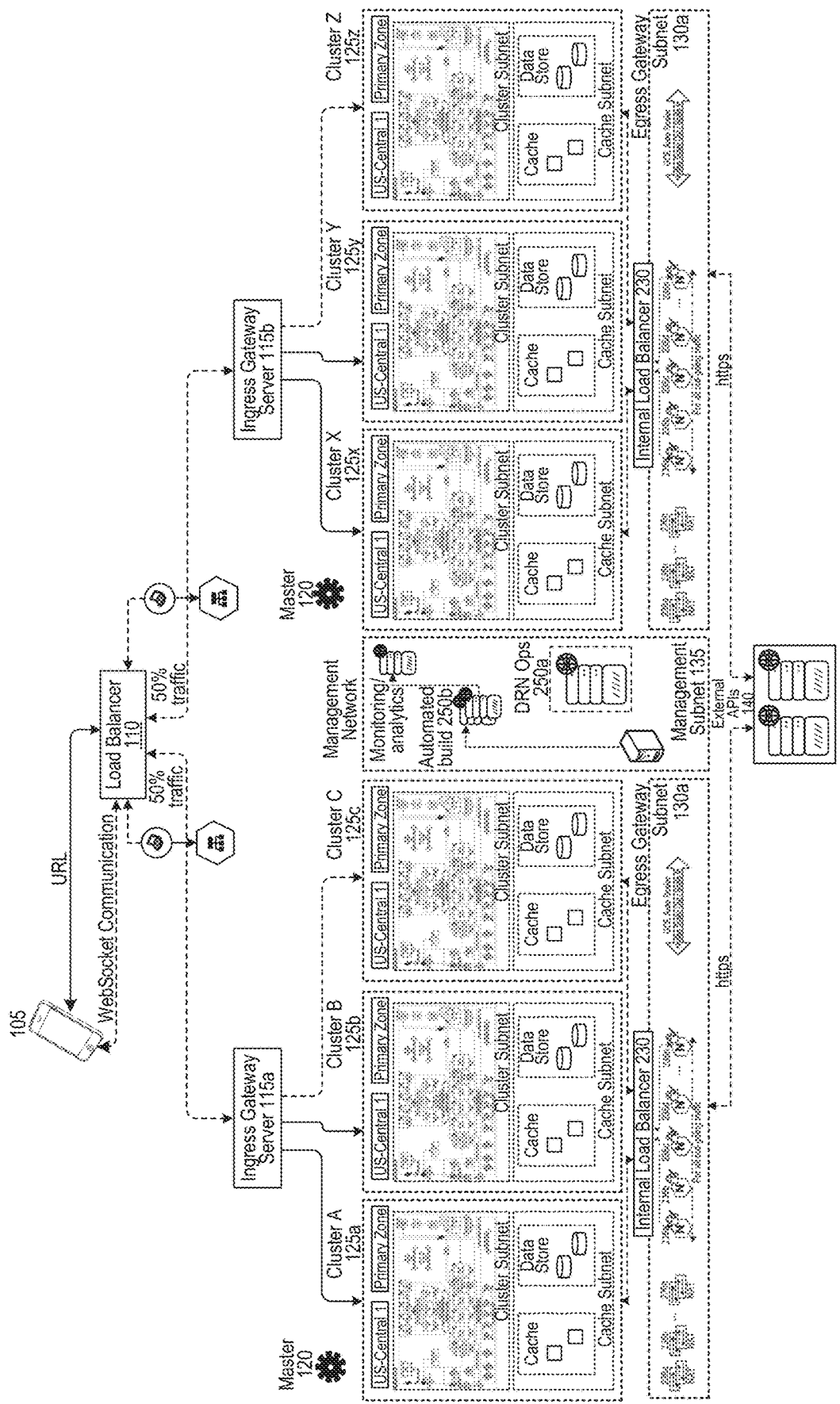
FIGS. 2A-2C are detailed system diagrams illustrating examples of a computing environment in which a cloud services management framework can be utilized.
Figure 2B:
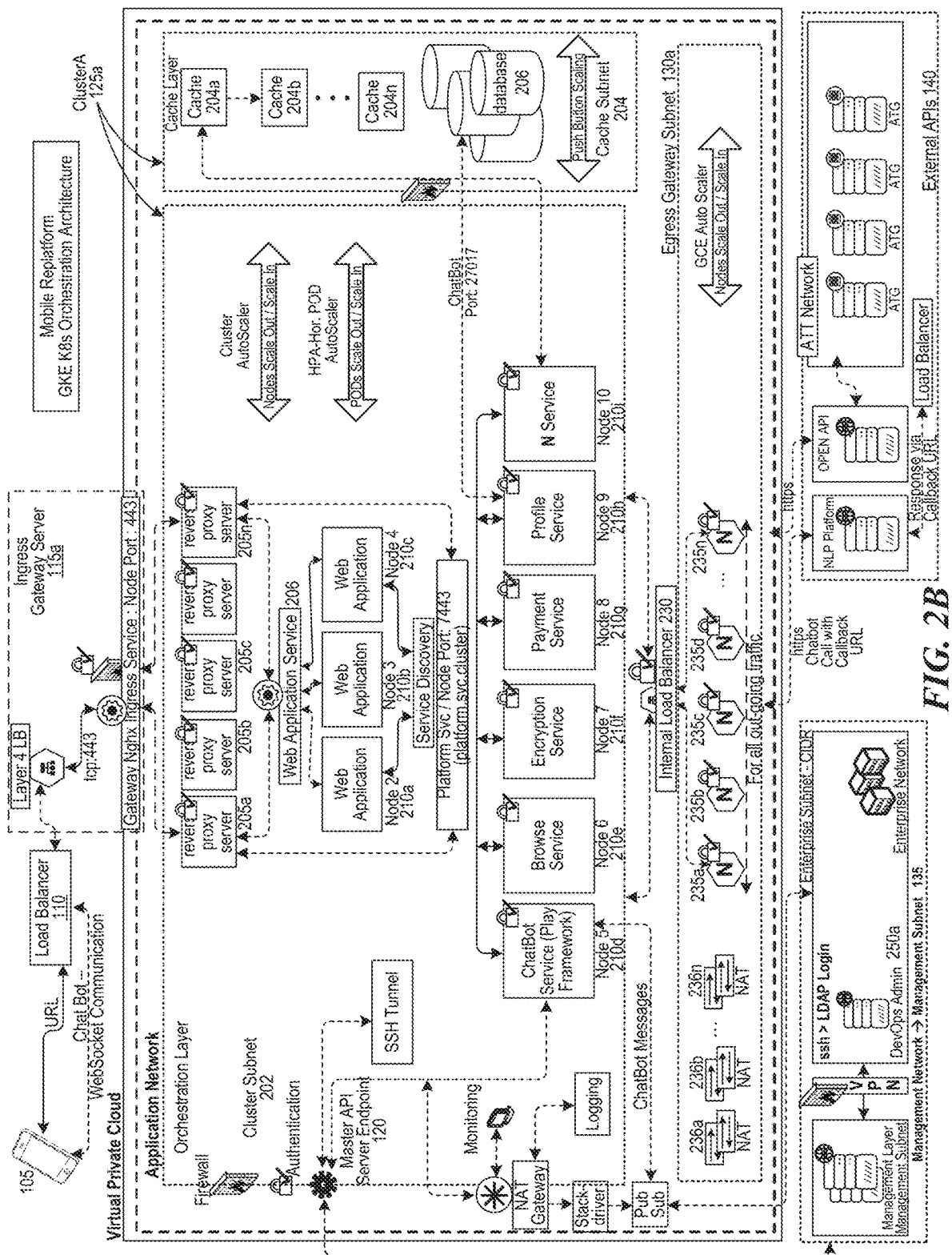
Figure 2C:
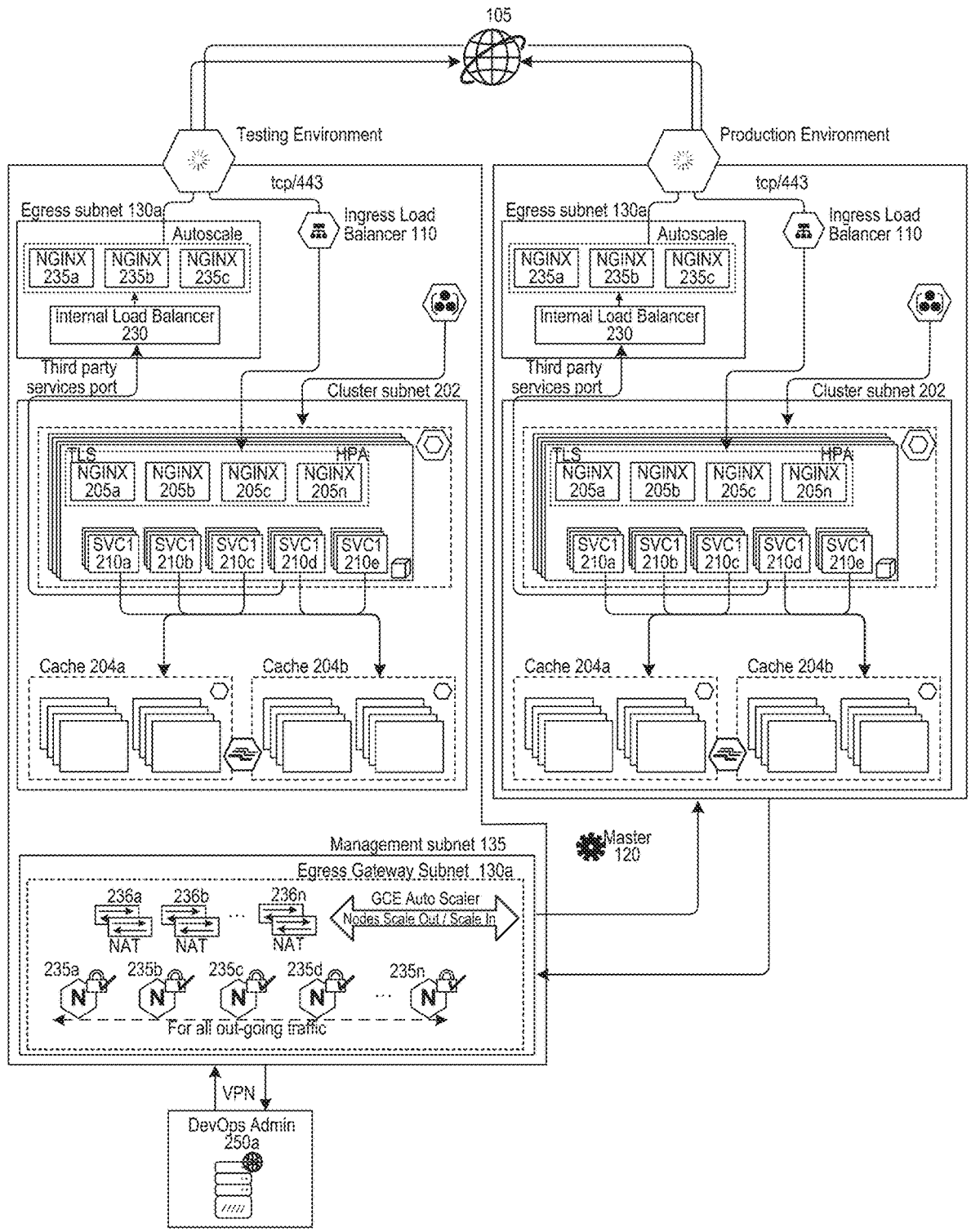

In light of the above problems, as well as others, the inventors have recognized a need for a cloud services management system and method that is capable of ensuring that communication between one or more cluster master(s) and cluster nodes is secure and not susceptible to security breaches even when the cluster master(s) and the cluster nodes reside in different networks (and/or have different security profiles), and in particular when one or more of the cluster master(s) and/or cluster nodes reside in a public network.

The following description provides certain specific details of the illustrated examples. One skilled in the relevant art will understand, however, that embodiments can be practiced without many of these details. Likewise, one skilled in the relevant art will also understand that the present disclosure can include many other obvious features not described in detail herein. Additionally, some well-known structures or functions may not be shown or described in detail below, to avoid unnecessarily obscuring the relevant descriptions of the various examples.

Several implementations are discussed below in more detail in reference to the figures. Turning now to the figures, FIGS. 1 and 2A-2C are system diagrams illustrating examples of a computing environment in which some implementations of the disclosed technology can operate.

Software (e.g., product, service, enterprise application, etc.) that is hosted on a cloud services platform can be operated using a computing system 105. Examples of computing systems, environments, and/or configurations that are suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

A request from the computing system 105 to an organization's network (for example, a request to a DNS server) can be routed to a load balancer 110. Load balancer 110 helps improve the distribution of workloads across multiple resources, such as computing clusters Cluster A (125*a*), Cluster B (125*b*), Cluster C (125*c*) . . . Cluster X (125*x*), Cluster Y (125*y*), Cluster Z (125*z*). Load balancer 110 can involve dedicated software or hardware, such as a multilayer switch. Load balancer 110 forwards the request (workload) to an Ingress Gateway (115a or 115b) that can then forward the request to one or more computing clusters (Cluster A (125a), Cluster B (125b), Cluster C (125c) . . . Cluster X (125x), Cluster Y (125y), Cluster Z (125z)). A master server 120 controls the allocation of resources across various nodes.

Each cluster comprises a cluster subnet 202 and a cache subnet 204. Both the cluster subnet 202 and the cache subnet 204 can be within an application network of an organization. The cache subnet 204 comprises cache servers 204a-n and databases 206 to the cache and stores information relating to a cluster. Within a cluster subnet 202, an incoming call/request is terminated at reverse proxy servers (for example, Nginx servers) 205a, 205b, 205c, . . . 205n. The reverse proxy server then originates a new request that is routed to one of the web application nodes 210a, 210b, 210c, and so on, via a web application service gateway/load balancer 206. A request from a web application node (210a/210b/210c) is then directed to one of the platform service nodes 210d-210i for service fulfillment. Examples of platform services include chatbot service 210d, browse service 210e, encryption service 210f, payment service 210g, profile service 210h, n service 210i, and so on. The nodes in a cluster are machines (VMs, physical servers, etc.) that run applications and cloud workflows. Clusters may be scaled in/scaled out (e.g., by removing/adding cluster nodes).

Platform service nodes 210d-210i can communicate with external APIs 140 to fulfil a portion of the request. To do so, platform service nodes 210d-210i can initiate an outgoing request to the external APIs 140 via an internal load balancer 230 that routes request to an egress gateway subnet 130a. An egress gateway subnet, which is also within the application network of the organization, comprises proxy servers (for example, network address translation (NAT) gateways) 236a-n and reverse proxy servers (for example, Nginx servers) 235a-n. Examples of external APIs 140 include, but are not limited to, credit card processing, payment processing, loyalty program processing, ecommerce search & browse APIs, ecommerce checkout APIs etc. All outgoing requests from the cluster 125a to external APIs are routed via the egress gateway subnet 130a.

A cluster is managed via one or more master(s) 120 to maintain the desired state for the cluster. The master 120 can refer to a collection of processes managing the cluster state. These processes may all run on a single node in the cluster, and this node may be referred to as the master. The master 120 can also be replicated for availability and redundancy. In some embodiment, all communication paths from the cluster to the master 120 terminate at an API server (apiserver). The apiserver can be configured to listen for remote connections on a secure HTTPS port (443) with one or more forms of client authentication enabled. One or more forms of authorization can be enabled, for example, when anonymous requests or service account tokens are allowed. Communications between the master 120 and clusters may be unsecured or secured (e.g., via HTTPS, SSH, security certificate, etc.).

Domain name to virtual IP mapping at a container/application level can be maintained in an .ETC host file. An application may use information in the .ETC host file to determine which virtual IP address the application egress traffic call should be routed to. Egress proxy servers (e.g., NGINX) may be configured with the domain names of external targets/APIs 140. An application egress traffic call from a cluster to the egress proxy server can be terminated and regenerated via an egress gateway to the external domain/API. The egress gateway can use whitelist information to authenticate/authorize (AUTH-AUTH) calls coming from the egress proxy server to the external domain/API. When a call passes the external egress gateway, the domain name may be resolved at the target domain name server. Application egress traffic from a cluster may be routed to the internal load balancer which may balance the traffic to an egress proxy server. When a load balancer is used to balance the traffic to the egress proxy servers, server(s) in the cluster may route all application egress traffic calls to the internal IP address of the load balancer, which may then forward the egress traffic calls to the appropriate egress proxy server for further processing and routing. A management subnet 135 can handle cluster operations. In some embodiments, management subnet 135 hosts toolsets of development operations 250a, such as automatic build operations, monitoring, analytics, etc.

Each computing cluster can implement its own version of a cloud services management system to manage incoming and outgoing communications/traffic. The computing systems on which the cloud services management system can be implemented include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices can include keyboards, pointing devices, touch screens, gesture recognition devices (e.g., for air gestures), head and eye tracking devices, microphones for voice recognition, and so on. The computing systems can include servers of a data center, massively parallel systems, and so on. The computing systems can access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media can have recorded on them or can be encoded with computer-executable instructions or logic that implements the recommendation system. The data transmission media are used for transmitting data via transitory, propagating signals or carrier waves (e.g., electromagnetism) via a wired or wireless connection. The computing systems can include a secure cryptoprocessor as part of a central processing unit for generating and securely storing keys and for encrypting and decrypting deployment data using the keys.

The cloud services management system can be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the cloud services management system can be implemented in hardware using, for example, an application-specific integrated circuit (ASIC).

Figure 3:
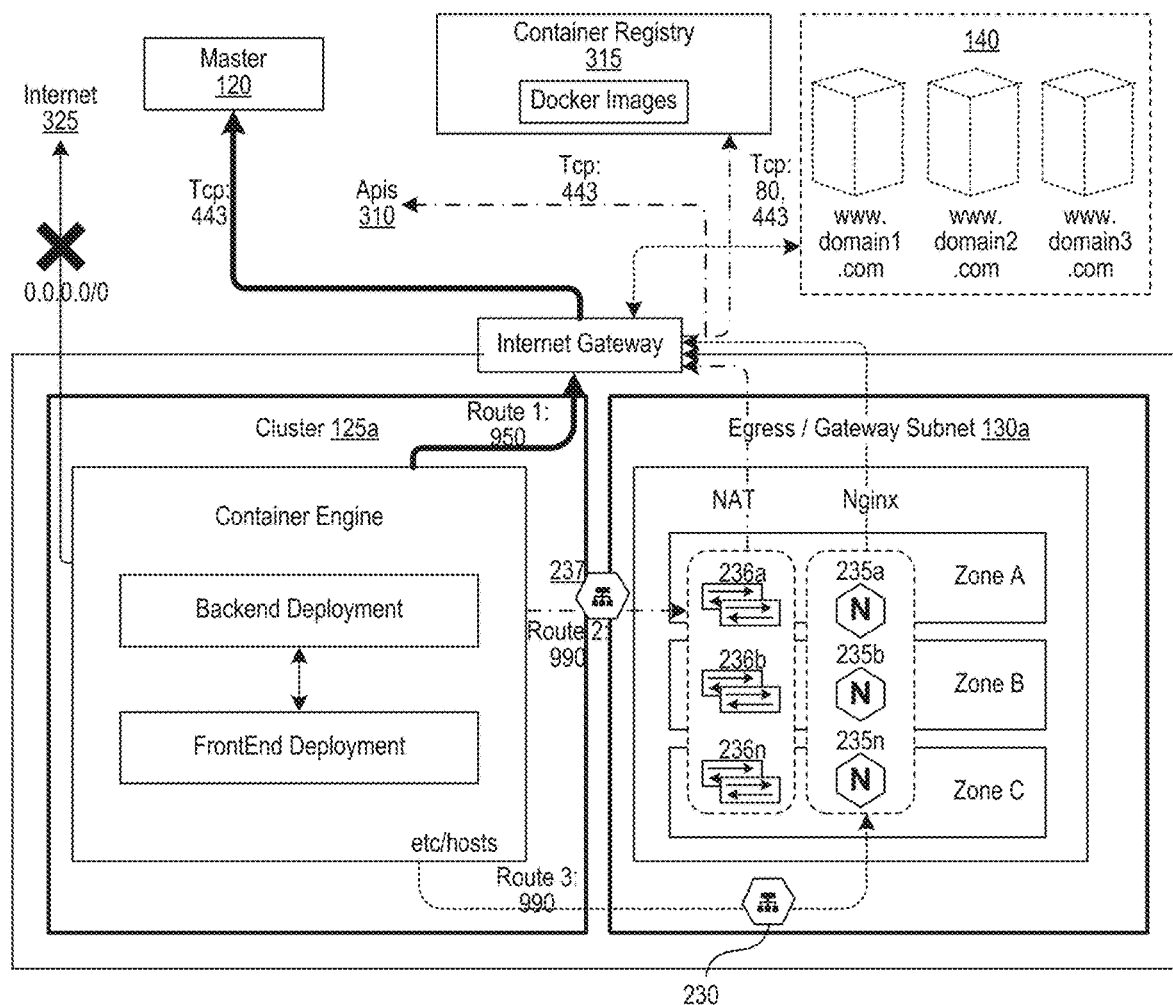
FIG. 3 is a data flow diagram illustrating an example of different routes between various actors in a computing environment.

FIG. 3 is a data flow diagram illustrating an example of different routes between various components in the computing environment. In some implementations, different route rules may be used to manage a cluster's 125a interaction with the Internet. For example, the cloud service management system may utilize three main communication paths between various components: (1) communication between cluster master 120 and a cluster 125*a*; (2) communication between a cluster 125*a* and one or more services/APIs 310 and/or 315 (for example, Google APIs in a Google cloud computing solution); and (3) communication between a cluster 125*a* and external domains 140. One purpose of these routes is to prevent direct communication between a cluster 125*a* and the Internet 325 (since such communication can be unsecured and prone to security risks and threats).

A first route rule (Route 1) is created to manage communication between cluster master 120 and each cluster 125*a*. For example, Route 1 manages communications between a Google Kubernetes master when it connects to clusters nodes over SSH tunnel and when the cluster nodes connects to the master over HTTPS. When a cluster 125*a* is being created, a temporary egress firewall rule is created for a preconfigured destination (for example, 0,0.0.0/0) on a secure port (for example, TCP port 443) and an ingress firewall rule is created for another secure port (for example, TCP port 22) with instance tag as timestamp. Similar rules can be created for other types of protocols, such as the User Datagram Protocol (UDP), Stream Control Transmission Protocol (SCTP), Encapsulating Security Payload (ESP), and Authentication Header (AH) protocols, and/or other protocols. Once cluster 125*a* is created, the temporary firewall rules are removed, and Route 1 is created. Route 1 allows secure communication (for example, Secure Shell (SSH)) from the cluster master 120 on a certain port (for example, port 22). Additionally or alternatively, Route 1 manages outgoing communications from the cluster 125*a* to the cluster master 120 through a default Internet gateway on the secure port (e.g., TCP port 443) using a header, tag, and so on (for example, an instance tag). Route 1 is assigned a particular priority value.

A second route rule (Route 2) is created to handle traffic related to cluster operations 310 and 315. For example, Route 2 can be used to communicate between a cluster 125*a* and services/APIs 310 and 315 to enable the handling of system calls, maintenance calls, health check calls, log, export, and other native calls. For this purpose, one or more Network Address Translation (NAT) gateways 236*a*, 236*b*, , 236*n* can be created in an Egress Gateway Subnet 130*a* for each zone (Zone A, Zone B, and Zone C). For example, one or more RHEL7 Linux servers are created with iptables update and net ip_forward. All IP traffic from the servers on the private network (in cluster 125*a*) is first routed to one or more of the NAT gateways 236*a*, 236*b*, . . . , 236*n*, which then handle communication with the services/APIs 310 and 315. To enable high availability, two or more instances of NAT gateways 236*a*, 236*b*, . . . , 236*n* can be created per cluster zone. Zones are created to provide resiliency, load balancing, and fail-over protection. A priority is associated with Route 2. The priority of Route 2 can be lower than that of Route 1. In several implementations, a different second route rule (Route 2) is created for each NAT gateway 236*a*, 236*b*, . . . , 236*n* (and in turn, each zone). The same or a different priority can be assigned to each Route 2 created for each NAT gateway. For example, assigning the same priority to each Route 2 enables load balancing. When different priorities are assigned to different Route 2s, load balancing may be stopped though fail-over can still work. Alternatively or additionally, traffic from the cluster 125*a* is routed to the NAT gateways 236*a*, 236*b*, . . . , 236*n* via a load balancer 237. In several embodiments, a container registry can store docker container artifacts (for example, docker images) for deployment.

A third route rule (Rule 3) is created to handle traffic between clusters 125*a* and external domains 140 (for example, external/third party API service calls). The third route can be administered and/or managed using domain whitelists, blacklists, firewalls, and so on. For instance, entries for all whitelisted domains in a host file (for example, an .ETC host file) of a cluster 125*a* can be updated with the IP address of an internal load balancer 230 so that all application domain calls are initially routed to the internal load balancer 230, which balances the traffic to the egress proxy servers 235*a*, 235*b*, . . . , 235*n* before routing the traffic, based on whitelist information, to external domains 140. Alternatively or additionally, the third route rule (Rule 3) is created by adding entries for all whitelisted domains in a host file (for example, an .ETC host file) at a host level (instead of at a cluster level). A priority is associated with Route 3. The priority of Route 3 can be lower than that of Route 1 and Route 2. In several implementations, Route 1 is assigned the highest priority, followed by Route 2, and Route 3. For example, in an environment where route priorities range from 1000 to 1, with 1000 being the lowest priority, Route 1 can be assigned a priority value of 900 (highest priority to achieve highest availability), Route 2 can be assigned a priority value of 950, and Route 3 can be assigned a priority value of 999.

Figure 4:
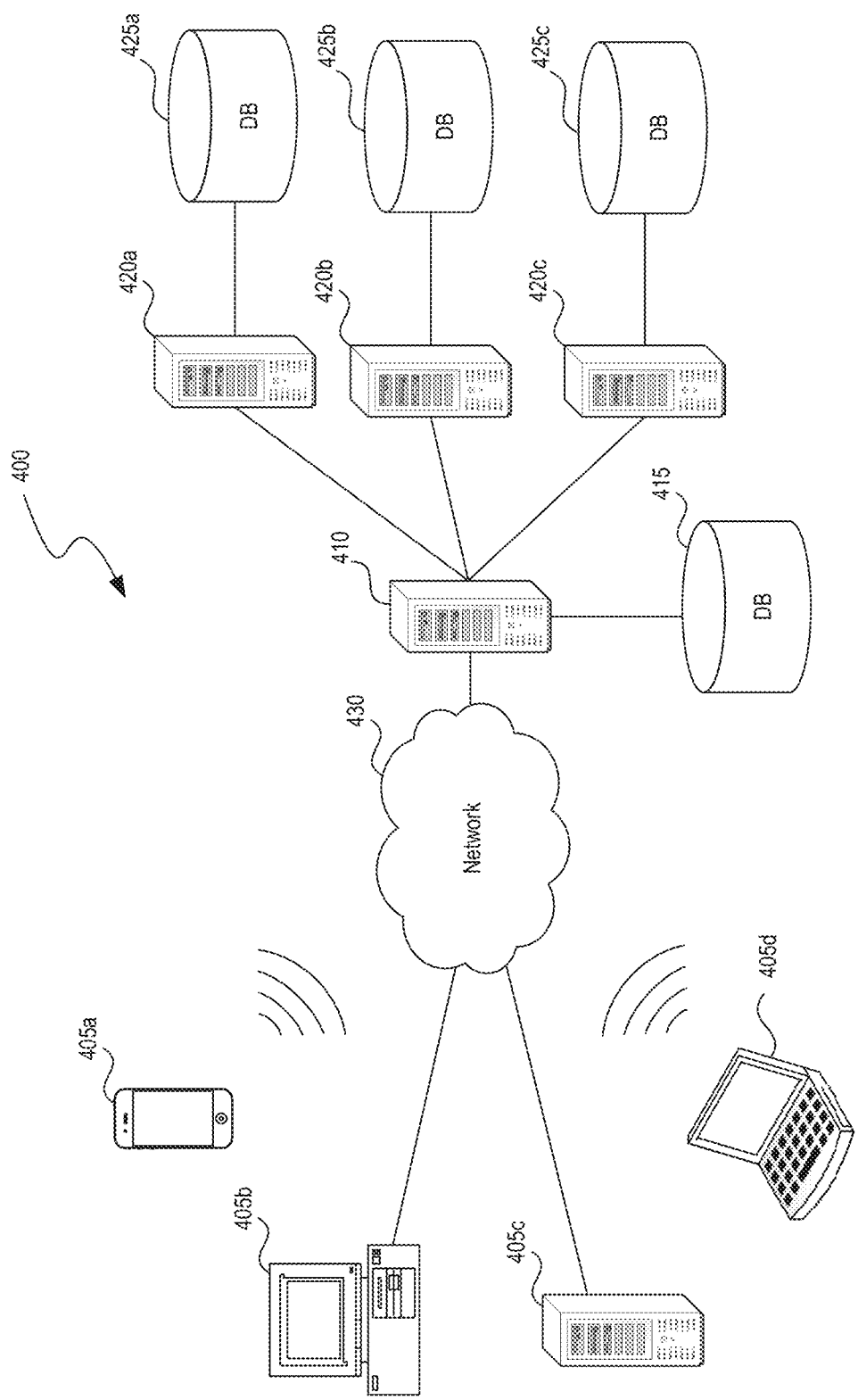
FIG. 4 is a system diagram illustrating an example of a computing environment in which a cloud services management framework can be utilized.

FIG. 4 is a block diagram illustrating an overview of an environment 400 in which some implementations of the disclosed technology can operate. Environment 400 can include one or more client computing devices 405*a-d*. Client computing devices 405*a-d* can operate in a networked environment using logical connections through network 430 to one or more remote computers, such as a server computing device 410.

In some implementations, server 410 can be an edge server which receives client requests and coordinates fulfillment of those requests through other servers, such as servers 420*a-c*. Server computing devices 410 and 420*a-c* can comprise computing systems. Though each server computing device 410 and 420*a-c* is displayed logically as a single server, server computing devices can each be a distributed computing environment encompassing multiple computing devices located at the same or at geographically disparate physical locations. In some implementations, each server 420*a-c* corresponds to a group of servers. The cloud services management system can be implemented in one or more of the client computing devices 405*a-d*, the server computing devices 410 and 420*a-c*, or both.

Client computing devices 405 and server computing devices 410 and 420*a-c* can each act as a server or client to other server/client devices. Server 410 can connect to a database 415. Servers 420*a-c* can each connect to a corresponding database 425*a-c*. As discussed above, each server 420*a-c* can correspond to a group of servers, and each of these servers can share a database or can have their own database, Though databases 415 and 425*a-c* are displayed logically as single units, databases 415 and 425*a-c* can each be a distributed computing environment encompassing multiple computing devices, can be located within their corresponding server, or can be located at the same or at geographically disparate physical locations.

Network 430 can be a local area network (LAN) or a wide area network (WAN), but can also be other wired or wireless networks. Network 430 may be the Internet or some other public or private network. Client computing devices 405 can be connected to network 430 through a network interface, such as by wired or wireless communication. While the connections between server 410 and servers 420*a-c* are shown as separate connections, these connections can be any kind of local, wide area, wired, or wireless network, including network 430 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements, blocks and acts of the various implementations described above can be combined to provide further implementations.

Any patents and applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects may likewise be implemented in a computer-readable medium. Accordingly, the inventors reserve the right to add additional claims after filing the application to pursue such additional claim forms for other aspects of the technology.

What is claimed is:

1. A method performed by a computing device within clusters of computing device nodes, the method comprising:
    configuring a first data route for a first type of traffic between at least one computing device node in a cluster of computing device nodes and a cluster master node;
    configuring a second data route for a second type of outgoing traffic from the at least one computing device node in the cluster to at least one cloud services node,
        wherein the at least one cloud services node is external to the cluster, and
        wherein the second type of outgoing traffic is routed from the at least one computing device node in the cluster to the at least one cloud services node via an egress gateway subnet, the egress gateway subnet comprising two or more zones that each include at least one network address translation gateway and at least one proxy server; and
    configuring a third data route for a third type of outgoing traffic from the at least one computing device node in the cluster to at least one domain,
        wherein the at least one domain is external to the cluster,
        wherein the third type of outgoing traffic is routed from the at least one computing device node in the cluster to the at least one domain via the egress gateway subnet; and
        wherein the first data route is assigned a first priority level, the second data route is assigned a second priority level, and the third data route is assigned a third priority level.

2. The method of claim 1 wherein the egress gateway subnet and the cluster are on a common network.

3. The method of claim 1 wherein the first data route routes secure communications from the cluster master on a first secure port, and
wherein the first data route routes outgoing communications from the cluster to the cluster master through a default Internet gateway on a second secure port.

4. The method of claim 3 wherein the first data route routes the outgoing communications from the cluster to the cluster master through the default Internet gateway on the second secure port using an instance tag.

5. The method of claim 1 wherein the first priority level is greater than the second priority level and the second priority level is greater than the third priority level.

6. The method of claim 1 wherein the second type of outgoing traffic comprises system calls, maintenance calls, native calls, or any combination thereof.

7. The method of claim 1 wherein the egress gateway subnet comprises at least one network address translation gateway and at least one proxy server.

8. The method of claim 1 wherein the second type of outgoing traffic is routed from the at least one computing device node in the cluster to the egress gateway subnet via a first load balancer.

9. The method of claim 1 wherein the third type of outgoing traffic is routed from the at least one computing device node in the cluster to the egress gateway subnet via a second load balancer.

10. The method of claim 1 wherein the third data route is managed using domain whitelists, domain blacklists, firewalls, or any combination thereof.

11. The method of claim 1 wherein the third data route is managed using domain whitelists in a host file associated with each cluster.

12. The method of claim 1 wherein the third data route is managed using domain whitelists in a host file associated with a host node that administers the clusters.

13. A non-transitory computer readable medium storing instructions, which when executed by at least one computing device within clusters of computing device nodes to perform a method of routing traffic, the method comprising:
configuring a first data route for a first type of traffic between at least one computing device node in a cluster of computing device nodes and a cluster master node;
configuring a second data route for a second type of outgoing traffic from the at least one computing device node in the cluster to at least one cloud services node,
wherein the at least one cloud services node is external to the cluster, and
wherein the second type of outgoing traffic is routed from the at least one computing device node in the cluster to an egress gateway subnet via a load balancer and routed to the at least one cloud services node via the egress gateway subnet, the egress gateway subnet comprising two or more zones that each include at least one network address translation gateway and at least one proxy server; and
configuring a third data route for a third type of outgoing traffic from the at least one computing device node in the cluster to at least one domain,
wherein the at least one domain is external to the cluster, and
wherein the third type of outgoing traffic is routed from the at least one computing device node in the cluster to the at least one domain via the egress gateway subnet.

14. The non-transitory computer readable medium of claim 13 wherein the first data route is assigned a first priority level, the second data route is assigned a second priority level, and the third data route is assigned a third priority level, and
wherein the first priority level is greater than the second priority level and the second priority level is greater than the third priority level.

15. The non-transitory computer readable medium of claim 13 wherein the second type of outgoing traffic comprises system calls, maintenance calls, native calls, or any combination thereof.

16. The non-transitory computer readable medium of claim 13 wherein the egress gateway subnet comprises two or more zones,
wherein each of the two or more zones comprises at least one network address translation gateway and at least one proxy server.

17. The non-transitory computer readable medium of claim 13 wherein the third data route is managed using domain whitelists in a host file associated with each cluster.

18. An apparatus for routing traffic from clusters of computing devices, the apparatus comprising:
at least one hardware processor;
at least one memory having contents configured to, when executed by the at least one hardware processor, perform a method comprising:
configuring a first data route for a first type of traffic between at least one computing device node in a cluster of computing device nodes and a cluster master node,
wherein the first data route routes secure communications from the cluster master on a first secure port, and
wherein the first data route routes outgoing communications from the cluster to the cluster master through a default Internet gateway on a second secure port using an instance tag;
configuring a second data route for a second type of outgoing traffic from the at least one computing device node in the cluster to at least one cloud services node,
wherein the at least one cloud services node is external to the cluster, and
wherein the second type of outgoing traffic is routed from the at least one computing device node in the cluster to the at least one cloud services node via an egress gateway subnet; and
configuring a third data route for a third type of outgoing traffic from the at least one computing device node in the cluster to at least one domain,
wherein the at least one domain is external to the cluster, and
wherein the third type of outgoing traffic is routed from the at least one computing device node in the cluster to the at least one domain via the egress gateway subnet.

* * * * *